United States Patent [19]

Rossberger et al.

[11] Patent Number: 4,830,801
[45] Date of Patent: May 16, 1989

[54] DEGASSING PROCESS FOR A WORM EXTRUDER

[75] Inventors: Erwin Rossberger, Grossdingharting; Josef Weinmaier, Pullach; Nikolaus Ailler, Egling, all of Fed. Rep. of Germany

[73] Assignee: Peroxid-Chemie GmbH, Hoellriegelskreuth, Fed. Rep. of Germany

[21] Appl. No.: 119,706

[22] Filed: Nov. 12, 1987

Related U.S. Application Data

[60] Division of Ser. No. 878,407, Jun. 19, 1986, Pat. No. 4,722,680, which is a continuation of Ser. No. 566,524, Dec. 29, 1983, abandoned.

[30] Foreign Application Priority Data

Dec. 30, 1982 [DE] Fed. Rep. of Germany ....... 3248659

[51] Int. Cl.$^4$ .............................................. B29C 47/76
[52] U.S. Cl. .................... 264/102; 264/211; 264/211.21; 264/211.23; 264/349
[58] Field of Search ...... 264/102, 349, 211.21–211.24, 264/211; 425/203, 204, 376 R, 376.1

[56] References Cited

U.S. PATENT DOCUMENTS

| | | | |
|---|---|---|---|
| 3,360,824 | 1/1968 | Schippers | 264/102 |
| 3,441,387 | 4/1969 | Dye | 264/102 |
| 3,447,582 | 6/1969 | Street | 425/209 |
| 3,535,737 | 10/1970 | Hendry | 425/203 |
| 3,751,527 | 8/1973 | Bortnick | 425/205 |
| 3,917,507 | 11/1975 | Skidmore | 264/102 |
| 3,963,558 | 6/1976 | Skidmore | 425/203 |
| 3,985,348 | 10/1976 | Skidmore | 425/203 |
| 4,117,548 | 9/1978 | Craig | 366/83 |
| 4,136,968 | 1/1979 | Todd | 425/204 |

FOREIGN PATENT DOCUMENTS

| | | | |
|---|---|---|---|
| 1554866 | 7/1970 | Fed. Rep. of Germany . | |
| 725892 | 4/1980 | U.S.S.R. | 425/203 |
| 725891 | 4/1980 | U.S.S.R. | 425/203 |

Primary Examiner—Jeffery Thurlow
Attorney, Agent, or Firm—Felfe & Lynch

[57] ABSTRACT

Process for a worm extruder or continuous kneader to produce either a degasses paste or plastic composition is disclosed. A mixture of either solid or liquid organic peroxides in the paste or plastic composition having evaporable constituents are introduced into the device, homogenized and degassed by exposing the mixture to a degassing passage of the extruder. The mixture has a free surface which is more than 40% of the cross-section of the degassing passage and the minimum gas passage cross-section of the return delivery device amounts to at least about 0.1 times the degassing passage cross-section.

5 Claims, 3 Drawing Sheets

DEGASSING PROCESS FOR A WORM EXTRUDER

This is a divisional of application Ser. No. 878,407 filed on June 19, 1986, now U.S. Pat. No. 4,722,680; which in turn is a continuation of Ser. No. 566,524 filed on Dec. 29, 1983, now abandoned.

BACKGROUND OF THE INVENTION

1. Field of the Invention

The invention relates to a degassing process used with a worm extruder or the like having a worm housing containing the worm or worms which is provided with at least one degassing passage opening into the worm chamber of the housing and a return delivery device arranged on the degassing passage for material which has penetrated from the worm chamber into the degassing passage, the return delivery device comprising a conveyor element arranged within the degassing passage and delivering to the worm chamber.

In the processing of synthetic plastic materials with the aid of a worm extruder or the like (especially a worm kneader or a worm injection-molding machine, each with one or more worms), the problem frequently arises that the material fed to the worm extruder or the like is mixed with water deriving, for example, from a washing process. In addition or alteratively, the supplied material can contain solvents and diluents such as hydrocarbons, chloro-hydrocarbons, ketones and volatile reaction products such as alcohols and/or esters, which must be removed together with the water in order to obtain optimum quality of the products delivered by the worm extruder or the like. Consequently the material to be processed in the worm extruder must be degassed before supply to the worm extruder olr in the worm extruder. In this context, by the expression degassing there are understood both the elimination of residual moisture (by evaporation or vaporisation) and the removal of dissolved gases and volatile constituents. Degassing in separate appliances preceding the worm extruder has the disadvantage of greater construction expense and a possible renewed contamination, especially moistening of the material on the way from the appliance to the worm extruder.

2. Description of Prior Art

A degassing device is known for example from the periodical "Plastverarbeiter" ('Plastics processor'), vol. 28, No. 5, 1977, pages 233 to 240. In this case the degassing of the material is obtained within the worm extruder with the aid of a radial degassing passage in the region of the middle of the length of the worm (see e.g. FIGS. 1 and 3). The degassing zone in the region of the degassing passage is preceded by a compression zone. At the transition from the compression zone into the degassing zone, which is at atmospheric presssure, an expansion of the material takes place leading to a gas emission by the material. In order to prevent penetration of the material into the degassing passage, the core diameter is greatly reduced in this region, so that the material does not completely fill out the cross-section of the housing. However this measure has not proved to be adequate to prevent a flow of material into the degassing passage. In order to counter this problem it is known from the initially cited periodical to insert a degassing pocket into the otherwise cylindrical worm interior chamber, in the region of the degassing passage. Further special developments of the degassing opening in the worm cylinder are known from the periodical "Kunststoffe" ('Synthetic Plastics') in volume 64, 1974, pages 175 to 177 (see e.g. FIG. 3). Moreover a so-called By-Pass Extruder is known (for example Wittfoht "Kunststofftechnisches Wörterbuch" ('Technical Dictionary of Plastics'), Part 3, Carl Hanser Verlag, Munich, Vienna 1978, page 367) in which a bypass passage of regulable throughflow opening into the degassing zone is provided for pressure regulation. However these known measures are frequently not fully satisfactory, since the precise setting of the material level close below the degassing passage opening is achievable only with great difficulty if at all. For safety's sake, consequently, the material level beneath the degassing opening will be set lower than absolutely necessary, which reduces the throughput of material through the extruder. In the case of materials of high viscosity, for example pastes, hitherto this so-called cylinder degassing could be applied only to an extremely limited extent, since the material in paste form always penetrates into the degassing passages. This leads firstly to the blockage of the degassing passages and also to a part of the material, namely the material which has penetrated into the passage, no longer being subject to the intended continuous processing and assuming different material properties. If this branched-off material is returned, sooner or later, into the worm chamber, a deterioration of the homogeneity of the material results.

In a known degassing device of the initially stated kind, the return delivery device consists of a double worm, that is two interengaging worms, arranged in a degassing housing, which rest along their circumference, except the region of mutual overlap, in more or less sealing manner on the internal circumferential surface of the housing interior, which in cross-section forms approximately a figure-of-eight. Now it has appeared that in the case of relatively tough compositions in the range between 0.1 and 10 kPA.s. a completely satisfactory degassing cannot be achieved. Thus what is called flash evaporation can occur, that is a sudden evaporation, in which mass particles of the material to be processed in the extruder are entrained by the gas current, leading to blockage of the return delivery device.

SUMMARY OF THE INVENTION

An object of the invention is to improve the degassing process of the initially stated kind to such effect that it reliably prevents blockage of the degassing passage, especially in the case of paste-type materials.

This object is accomplished in that the free surface (evaporation area) of the material to be processed in the extruder amounts, within the degassing passage, to more than about 40% of the cross-section of the degassing passage, and in that the minimum gas passage cross section of the return delivery device amounts to at least aobut 0.1 times, preferably at least about 0.15 times, the degassing passage cross-section.

The return conveyor device provided in accordance with the invention permits the removal of even large gas volumes, without the degassing passage being blocked. The reason for this may be that, by reason of the large evaporation area, a smooth vapour generation occurs avoiding the entraining of particles of composition. The term "evaporation area" is understood to mean the the surface of the material to be processed in the extruder, within the degassing passage, which surface is in direct communication with the space outside the worm housing, that is either the surroundings or a vacuum suction installation. Between the evaporation area and the surroundings or the vacuum suction installation there may also be a passage with reduced passage cross-section, which however must be of such large dimensions that no appreciable excess pressure develops above the evaporation area, so that the vapour generation is undisturbed.

The term "degassing cross-section" in this context is understood to mean the pure passage cross-section (that is without conveyor element) which corresponds to the entry area for the extruder material for entry into the degassing passage. The gas passage cross-section on the other hand is the cross-section presented to the gas current with the conveyor element inserted. In the case of the known return delivery device the evaporation area and the gas passage cross-section are substantially smaller. This is due for one part to the fact that the two worm cores greatly reduce the available evaporation area, and next to the fact that by reason of the interengagement of the two worms the space formed between two successive worm turn flanks is not fully available as gas passage cross-section; only a fraction thereof corresponding to the clear interval between the interengaging worms is available as gas passage cross-section.

According to a first form of a preferred embodiment of the invention the conveyor device comprises a single, preferably rotating, inclined scrapter sweeping over at least a part of the degassing passage cross-section, preferably in the form of a single conveyor worm in the degassing passage, preferably with worm axis substantially parallel to the passage axis, delivering towards the worm chamber. In the case of paste material with relatively high viscosity the possibility exists of making the conveyor worm diameter smaller than the diameter of the degassing passage, since by reason of the high viscosity and stiffness even material more or less remote from the conveyor worm is transported by it. In an especially preferred form of this embodiment of the invention, however, the axis of the conveyor worm coincides with the axis of the hollow cylindrical degassing passage and that the conveyor worm diameter substantially corresponds to the passage diameter. This form of the embodiment, which is suitable for high viscosities (in the range from 1 to 10 kPa.s.) of material in paste form, ensures that the inner wall of the passage always remains free from deposits of material.

In a further development of the invention it is proposed that the spiral or spirals of the conveyor worm each have at the worm end nearest the worm chamber an end edge running in radial direction towards the core. Consequently the rotating worm end sweeps, on the material swelling up in the passage, along a flat circular area filling out the passage cross-section, so that the rising material is immediately pressed back into the worm chamber again. Since however at any moment the worm is in contact with the material only at the end face of the core and at the edge of the worm spiral, a relatively large free evaporation area of the material formed by the remainder of the passage cross-section results. The edge sweeping on the material effects a certain beating of the material, which again facilitates the liberation of the gases. Since the formed vapours can flow without hindrance along the turns of the conveyor worm, the result is that the minimum gas passage cross-section of this return delivery device is equal to the evaporation area.

A worm diameter amounting to about 5 to 20 times, preferably about 8 to 15 times, optimally about 10 times, the core diameter (of the conveyor worm in each case) has proved especially favourable.

A maximum passage cross-section and thus a maximum evaporation area of the material is obtained for a given extruder if, as proposed in accordance with the invention, the passage diameter corresponds approximately to the dimension of the worm chamber perpendicular to the longitudinal axis of the worm chamber and to the passage axis.

A speed of rotation of the conveyor worm amounting to about 20 to 120, preferably about 40 to 80, optimally about 60, revolutions per minute has proved advantageous.

According to a further embodiment of the invention, the return delivery device comprises a conveyor roll in the degassing passage with roll axis substantially perpendicular to the axis of the passage, delivering towards the worm chamber. This form of embodiment is of universal suitability for pastes in a wide viscosity range (0.1 to 10 kPa.s.); however it has proved especially advantageous for mixtures or pastes with viscosities in the range from 0.7 to 3 kPa.s.

The material returned by the roll is fed back immediately to the remainder of the material flow in the worm chamber, in the correct direction of movement, if in accordance with the invention the direction of rotation of the conveyor roll is opposite to the direction of rotation of the worm or worms in the worm chamber.

In order reliably to preclude material deposits on the conveyor roll according to the invention a scraper extending along the conveyor roll is provided for material from the worm chamber which has settled on the roll circumference. The scraper is arranged above one worm of the worm chamber in such a way that material falling from the scraper is carried away by the worm. This ensures that even the material falling from the scraper is immediately processed further in the intended manner.

In an especially preferred embodiment of the invention the conveyor roll is arranged in the degassing passage in such a manner that a passageway is formed between each of the longitudinal side walls of the degassing passage, which are substantially parallel to the roll axis, and the roll circumference, and that the scraper is arranged in that passageway which immediately follows the worm chamber in the direction of rotation of the roll. The minimum gas passage cross-section of the return device corresponds to the total passage cross-section of the two passageways. In most cases it is sufficient if only one of the passageways is free and the other is closed by the scraper, since even the cross-section of one single passageway in general is completely sufficient to prevent a build-up of pressure above the evaporation area which would prevent the evaporation process.

With the proposed high paste viscosities the conveyor roll conveys even material lying relatively far from it, so that the diameter of the roll can be made considerably smaller than the corresponding dimension of the degassing passage, which is preferably of rectangular cross section, preferably, the conveyor roll diameter amounts to about 0.4 to 0.9 times, better 0.5 to 0.7 times, optimally about 0.65 times, the clear distance between the longitudinal side walls of the degassing passage, which are parallel to the conveyor shaft axis.

In total a relatively large evaporation area results which is formed by the surfaces of the extruder material which has swelled up into the degassing passage, on both sides of the conveyor roll which dips more or less far into the extruder material, and also by the material layer surface which adheres to the conveyor roll and finally is removed from the roll circumference by the scraper. Thus the effective evaporation area can be even larger than the degassing cross-section. At least one open passageway offers an adequate gas passage cross-section for the liberated gases.

If, as proposed in accordance with the invention, the roll axis extends substantially parallel with the longitudinal axis of the worm chamber, the roll axis length can be made relatively large, since its size is now independent of the cross-sectional dimensions of the worm chamber. Correspondingly the evaporation area and the minimum gas passage cross-section are also enlarged.

The degassing device in accordance with the invention can also be used with particular advantage in combination with a vacuum suction device, since here again the return delivery device reliably ensures that the material remains in the worm chamber. To this end it is suggested that an extractor attachment covering the outer end of the degassing passage be used on the worm housing, being connected to a vacuum suction device. In order that the drive motor for the return conveyor device may be operated outside the vacuum zone it is proposed that the suction attachment comprises a vacuum duct for a drive shaft coupled with a drive motor, preferably a compressed-air motor, and driving the return conveyor device. By way of example an electric motor or equally a compressed-air motor can be considered as drive motor.

An especially simple assembly results in the case of a conveyor worm, since then the drive shaft can be rigidly connected with the conveyor worm shaft, preferably made in one piece therewith.

For the case where a conveyor roll is used, it is proposed that the drive shaft be connected with the roll shaft through a gearing, preferably a spur wheel gearing.

In order to ensure a thorough degassing or drying, as the case may be, and in order to counteract the formation of deposits in the return conveyor device, it is suggested that the return conveyor device be heatable, preferably by the conducting of heating medium through a housing wall interior space of a double-walled housing of the return conveyor device.

The invention further relates to an extruder having a degassing device of the kind as described above, which is formed as a dobule-shaft extruder, preferably with worms rotating in the same direction. In order to obtain the largest possible evaporation area of the material, that is to say the largest possible passage cross-section, it is proposed that the axis of the passage should extend perpendicularly of the plane defined by the two worm axes, preferably approximately equidistantly from the two worm axes. The concept "evaporation area" in this context is naturally not limited to the emission of vapour by the material, but to the emission of gases of all origins.

The invention further relates to an extruder having a degassing device of the kind as described above, which is formed as single-shaft extruder with axially, preferably pulsatingly, movable worm.

In order to gain the most extensive possible degassing in such extruders, and also for example in planet roll extruders, worm kneaders or worm injection-molding machines, it is proposed in accordance with the invention to use two degassing devices of the kind according to the invention, arranged with spacing one behind the other in the direction of the longitudinal axis of the worm chamber.

It is of essential importance for reliable progress of the working process with the aid of the worm extruder or the like that the material to be fed to the extruder is of high regularity. For this purpose in accordance with the invention a quantity-regulating feed device, preferably an eccentric worm pump, is provided at the material feed opening of the extruder.

The invention further relates to a process for the production of peroxide-containing pastes or plastic compositions, especially using the degassing device according to one of the preceding embodiments. Such pastes or plastic compositions contain organic peroxides in a plastic or liquid matrix, for example a desensitizing agent, or mixtures thereof. Such mixtures of organic peroxides with carrier substances were hitherto produced in batches in kneaders or planetary agitator mechanisms. To ensure that the paste possesses the necessary high homogeneity, processing times of 5 to 20 hours (in the kneader) are necessary. In the case of very high paste viscosities of 1 to 5 kPa.s. a homogenization in the kneader is often no longer possible to an sufficient extent. Additional difficulties arise in the case of very viscous pastes, since then cavities occur in the kneader, with the paste forming bridges above the kneading arms and therefore no longer being homogenized. Although it is possible to carry out an after-treatment in a two-roll or three-roll mechanism in order to achieve the desired homogeneity, this is of considerable detriment to the economy of the process.

Mixtures which are obtained by an in situ process from chemical synthesis are used for preference as starting materials for the production or mixing of the peroxide-containing pastes, because such products contain the peroxide in finely crystalline form in uniform distribution in a matrix. These products of synthesis are mixed with water deriving from the process of washing the composition (generally 4 to 10% water). Moreover such paste pre-products can contain solvents and diluents such as hydrocarbons, chloro-hydrocarbons and/or ketones and volatile reaction products such as alcohols and/or esters which must be removed in order to obtain optimum quality for the subsequent utilisation of these pastes.

The particle size of the peroxide distributed in the liquid or plastic matrix and the uniformity of the distribution are also of special practical importance. Thus, for example, for the cross-linking of silicone rubber with a peroxide—such as benzoyl peroxide or dichloro benzoyl peroxide—it is necessary that the crystal size of the peroxide not exceed 20 $\mu$m., because otherwise bubbles can form in the silicone rubber in the cross-linking reaction. If the paste contains agglomerates of the perioxide, after it is worked into the silicone rubber inhomogeneous distributions can result having the consequence of inadequate strength values after vulcanisation.

In the known manner of working with production of the pastes in the kneader only about 70% of the batches are obtained in the requisite quality; the remainder must be rehomogenized with a roller frame, in a complicated manner. The production process by means of kneader or rolling mill is also very labour-intensive, since the filling and emptying must be done manually. The usual conveyor worms on the kneader devices are unsuitable since, in the emptying of a kneader with a discharge worm, at most only 80% of the content can be withdrawn. The remainder remains adhering to walls and kneader arms and to the lid of the kneader.

In accordance with the invention a process is provided which is capable of distributing extremely fine particles, especially of size below 10 μm., in a liquid or plastic matrix extremely homogeneously without agglomeration, with removal of volatile constituents, including even moisture, from the mixture. The process according to the invention also presents the possibility of automation and of processing with exclusion of atmosphere, which largely eliminates the safety risks in the processing of organic peroxides. For this purpose the process according to the invention is characterized in that a plasticisable or plastic mixture of solid and/or liquid organic peroxides and any solid additives with a liquid or plastic matrix is freed from evaporable constituents and (at the same time) homogenized in a worm extruder or continuous kneader.

In contrast to the known process, the process according to the invention can be carried out continuously if the mixture to be treated is conducted continuously through an evaporation or drying zone.

The degree of degassing or moisture extraction can further be increased if the evaporation and/or drying process is carried out in vacuo.

Penetration of the material into the degassing passage or even entraining of the material with the emerging gases in the case of vacuum degassing is reliably prevented according to the invention in that, in the vacuum degassing passage of the worm extruder or continuous kneader, material penetrating into a degassing passage is returned by a return device. It is also of particular advantage that the use of the return device renders it possible to select an enlarged degassing passage crossection and thus an enlarged evaporation area of the material.

The various features of novelty which characterize the invention are pointed out with particularlity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
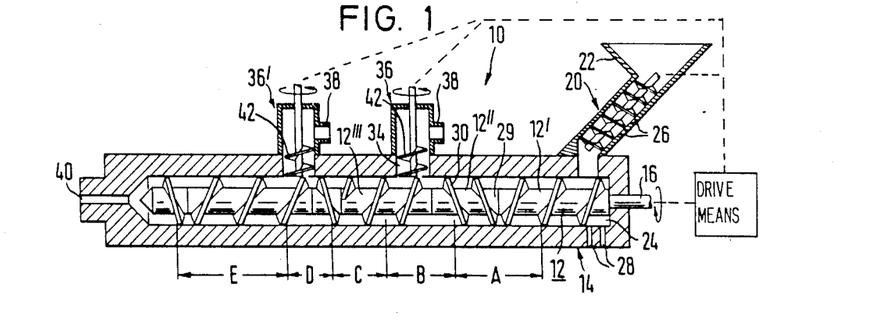
FIG. 1 is a roughly diagrammatic lateral elevation of a worm extruder according to the invention.

The worm extruder 10 as represented roughly diagrammatically in FIG. 1 consists of a worm housing 14 containing one or more worms 12. For the sake of simplicity in FIG. 1 there is represented only one worm of a two-shaft extruder, as may be seen in greater detail in FIGS. 2 and 3. At the right end of the housing 14 in FIG. 1 a drive shaft 16 of the worm 12 is conducted out of the housing 14 for connection to a motor (not shown). The material intended for processing in the extruder 10 is fed to the extruder 10 by a symbolically represented eccentric worm pump 20 (with feed hopper 22) which opens at the right extruder end in FIG. 1 into the worm chamber 24 accomodating the worm or worms. Water liberated by the compression of the material in the compacting in the eccentric worm pump 20 and at the right worm end can be drained away here, which is symbolically indicated by the water outlet passages 26 and 28 in FIG. 1.

The worm 12 consists of a plurality of sections connected for joint rotation, which sections can differ by different pitches or equally by different delivery directions. In the purely diagrammatic example as illustrated a relatively long section 12' at the right end of the worm is followed by a relatively short section 12" with opposite delivery direction which, by reason of its shorter length, merely leads to a build-up of the extruder material in this region. An axial section, designated by A in FIG. 1 of the extruder 10, can therefore be called build-up or compression zone, which constitutes a vacuum-tight seal of the following zones against atmosphere. On the core 29 of the worm 12 besides the spirals 30 as illustrated still further spirals can be provided and/or radially protruding pegs for conveying the mixture of the supplied material. The short section 12" is adjoined by a section 12''' which corresponds as regards its delivery direction to the first section 12'. This has the consequence that the pressure in the material (paste) falls off; accordingly zone A is followed by a decompression zone designated by B. By reason of the pressure drop in the material, water vapour and dissolved gases are liberated. In the region of the decompression zone B the housing 14 is provided with a radial degassing passage 34 which is part of a degassing device 36, to be explained further by reference to FIG. 2. The gases or vapours liberated in the decompression zone B can escape through this degassing passage 34. To promote this process the degassing device 36 is connected through a vacuum connector 38 to a vacuum suction device (not shown). The worm housing 14 can also be made heatable, at least in the region of the decompression zone B, in order to reinforce the evaporation.

The decompression zone B is adjoined by a second build-up zone C, which is followed by a second decompression zone D, which is achieved by appropriate formation of the individual worm sections in this region, as already described above. In the region of this zone D a second degassing device 36' is provided in correspondence with the first degassing device 36. Again a build-up zone E adjoins for the vacuum-tight closure of the adjoining region against atmosphere. The discharge opening 40 of the extruder 10 at the left end of the extruder in FIG. 1 is adjoined by a compacting and length-cutting device (not shown).

Figure 2:
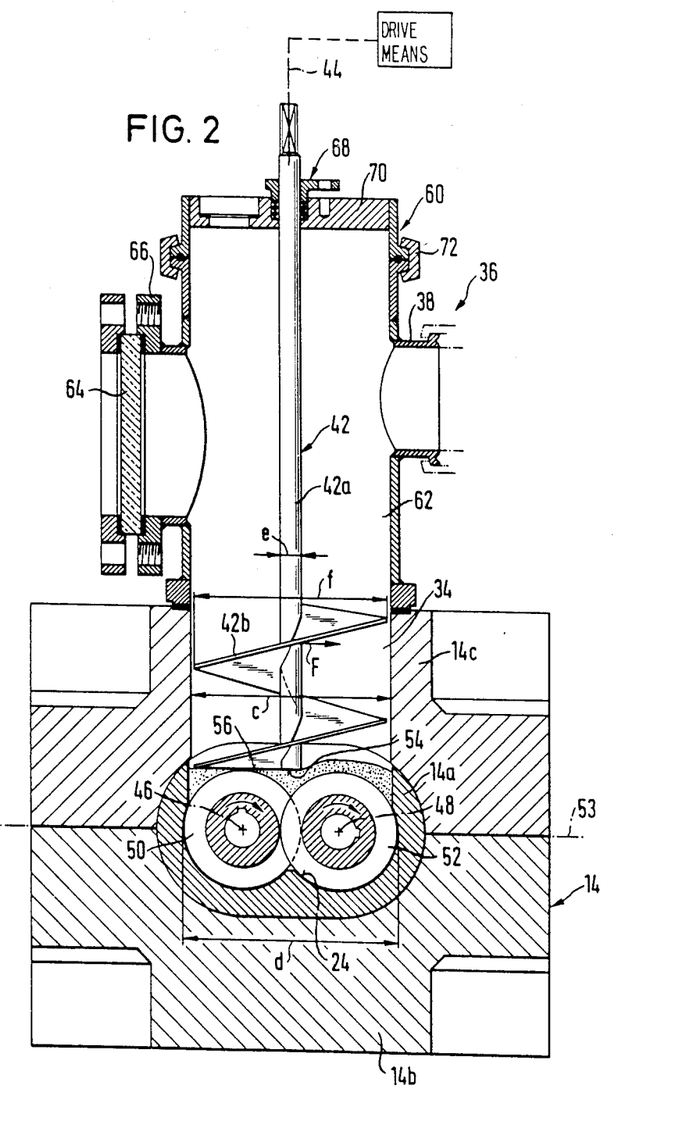
FIG. 2 is a cross-section on an enlarged scale through a worm extruder similar to FIG. 1 in the region of the degassing device in a first embodiment of the invention.

FIG. 2 shows a first form of embodiment of the degassing device according to the invention, similarly to the symbolic representation in FIG. 1. The degassing device 36 consists of a conveyor worm 42 with core 42a and spiral 42b, inserted into the cylindrical degassing passage 34. The conveyor worm axis 44 coincides with the cylinder axis of the degassing passage 34. The axis 44 is perpendicular to a plane 53 defined by the two axes 46 and 48 of the two worms 50 and 52 of the double-shaft extruder 10. The axis 44 is equidistant from the two axes 46 and 48. The diameter c of the passage 34 is slightly smaller than that dimension of the worm chamber 24 of the housing 14 accommodating the two worms 50 and 52 which lies within the plane 53 and is perpendicular to the axes 46 and 48. This dimension, designated by $d$ in FIG. 2, is the largest dimension of the cross-sectional area, represented in FIG. 2, of the worm chamber 24.

The housing 14 is in three parts and consists of an inner housing part 14a of elongated oval cross-section accomodating the two worms 50 and 52 and of two further parts, a lower part 14b and an upper part 14c, commonly enclosing the part 14a. The mentioned passage 34 passes through both the upper part 14c and the part 14a above the two worms 50 and 52.

The core diameter $e$ amounts to about 1/10th of the worm diameter f which substantially corresponds to the passage diameter c. The core 42a is formed at its lower end with a radial end face 54. The worm spiral 42b here terminates in an edge 56 running in radially towards the core 42a and lying in the plane of the end face 54. On rotation of the conveyor worm 42 in the counter-clockwise direction seen from above (movement arrow F) the edge 56 moves along a circular surface perpendicular to the axis 44, while the region of the worm spiral 42b' preceding the edge 56, inclined in the direction of rotation and slightly upward, ensures a levelling of the paste which has swelled upwards above this circular area (that is entered into the passage 42). Per se a rotating or reciprocatingly movable spatula having the edge 56 would suffice for this levelling; however the conveyor worm has the advantage that material which has momentarily swelled up above the edge 56 is conveyed back again into the region below the conveyor worm.

The speed of rotation of the worm 44 here amounts to about 60 revolutions per minute. The drive of the conveyor worm 42 takes place by means of a compressed-air motor (not illustrated in FIG. 2) which is coupled to the upper end in FIG. 2 of the worm 42. This end lies outside an extractor attachment 60 which is flanged on to the outside of the worm housing 14 (on the upper side of the housing 14c), with a cylindrical interior space 62 of the attachment 60 in alignment with the passage 34. The extractor attachment 60 closes off the passage 34 from atmosphere. Furthermore it is provided with the flange 38, already mentioned in connection with FIG. 1, for connection to a vacuum suction device (not shown). The flange 38 starts from the external circumference of the cylindrical extractor attachment 60. Opposite to the flange 38 there lies a flange 66 closed off by an observation window 64 of transparent material. The core 42a of the conveyor worm 42 is conducted to the exterior, for connection to the mentioned compressed-air motor outside the extractor attachment, by way of a rotational-movement-permitting vacuum duct 68 of an upper lid part 70 of the extractor attachment 60. The lid part 78 is detachably connected with the remainder of the housing through a clip connection 72.

Figure 3:
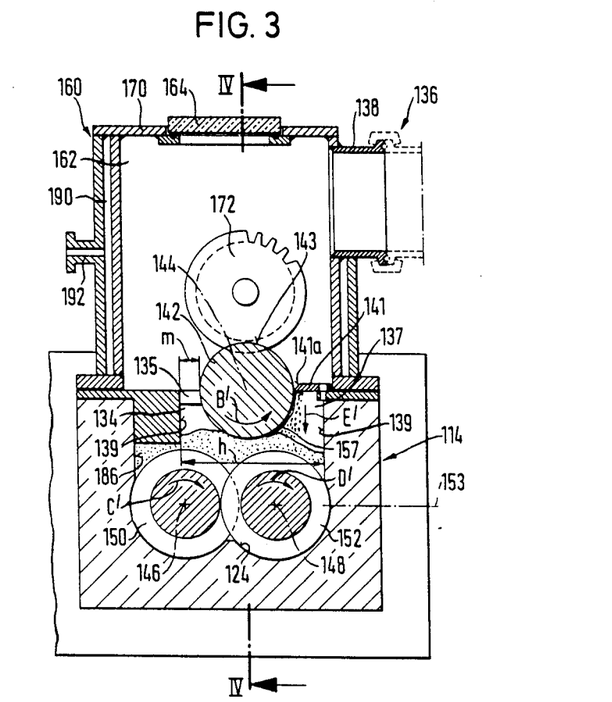
FIG. 3 is a cross-section similar to FIG. 2 of a second embodiment of the degassing device (section along line III—III in FIG. 4)
Figure 4:
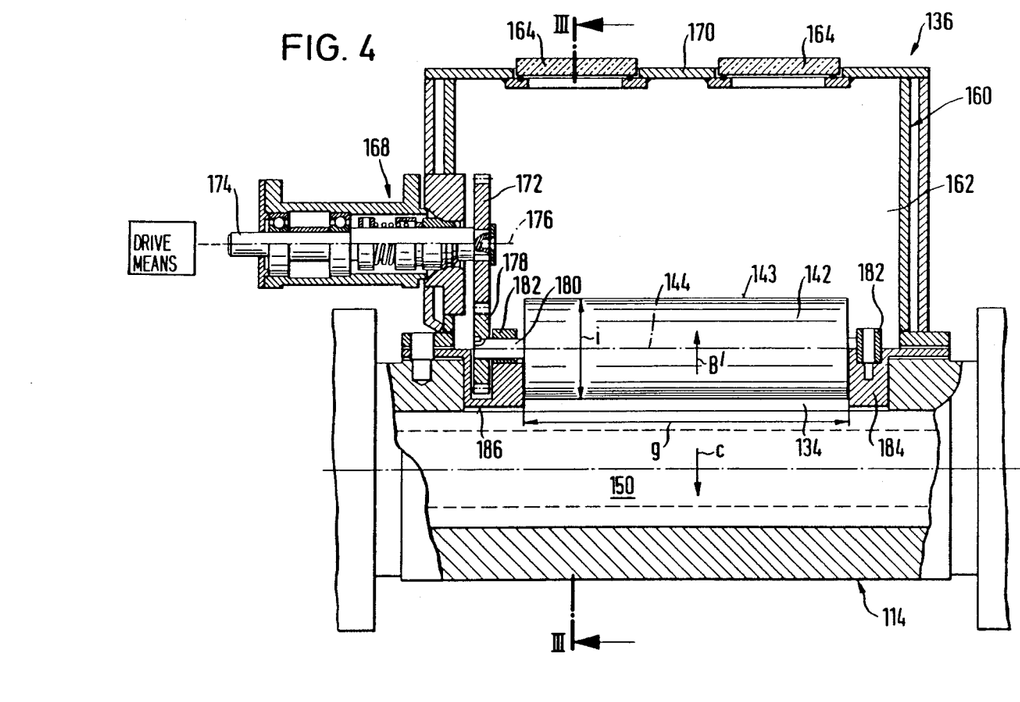
FIG. 4 is a section of the arrangement in FIG. 3 along the line IV—IV.

In FIGS. 3 and 4 there is represented a second form of embodiment of the degassing device which is generally designated by 136. Elements in FIGS. 3 and 4 which correspond in function to elements in FIG. 2 are provided with the same reference numbers each increased by the number 100. The conveyor worm 42 of the first embodiment is in this case replaced by a conveyor roll 142 with cylindrical circumferential surface 143 with different orientation; while the axis 44 of the conveyor worm 42 lies in a plane radial in relation to the worm axes 46 and 48, the roll axis 144 extends parallel to the axes 146, 148 of the two worms 150 and 152. The direction of rotation (arrow B' in FIG. 3) is opposite to the direction of rotation of the two worms 146 and 148 which rotate in the same direction (arrows C' and D').

The conveyor roll 142 is inserted into a degassing passage 134 whose passage axis, perpendicular to the passage cross-section, stands perpendicularly on the plane 153 defined by the axes 146 and 148. The passage 134 is rectangular in cross-section. The length $g$ of the passage cross-section, parallel to the axes 146 and 148 (and 144) corresponds to the axial length of the conveyor roll 142; the width $h$ perpendicular thereto of the passage cross-section exceeds the diameter $i$ of the conveyor roll 142. The conveyor roll 142 is so arranged, according to FIG. 3, that its axis 144 extends at the level of the upper passage mouth approximately at mid width. Accordingly the roll 142 only partly closes off the passage 134. To the left of the roll 142 in FIG. 3 a first passageway 135 is formed which is defined firstly by the circumferential surface 143 of the roll and also by a side face 139 of the passage 134 which is parallel to the axes 146, 148. The clear interval $m$ between the side face 139 of the passage 134 and the circumferential surface 143 of the roll amounts to about 0.15 times the width $h$ of the passage cross-section.

A passageway 137 is correspondingly formed on the other side. However this passageway is closed off about at the level of the axis 144 by a scraper 141 fitted rigidly on the one-piece) worm housing 114 and extending along the surface 139. The scraper 141 rests with a scraper edge 141a on the external circumference (along a generatrix) of the roll 142, so that in the rotation of the roll 142 in the direction B' it scrapes paste material 157 deposited on the roll circumference away from the roll and lets it fall downwards into the region of the right worm 152 in FIG. 3 (arrow E' in FIG. 3).

The passage 134 with roll 142 is covered over on the outside of the housing 114 by an extractor attachment 160 which, in conformity with the attachment 60 according to FIG. 2, again ensures a vacuum-tight closure of the passage 134 from atmosphere, while again a suction connector 138 is provided for connection to a vacuum suction device (not shown).

The drive of the roll 142 is effected by a compressed-air motor (not shown) of which a drive shaft 174, visible in FIG. 4, is conducted through a vacuum duct 168 into the interior 162 of the attachment 160 with shaft axis 176 parallel to the axes 146, 148, 144. On the inner end of the shaft a spur gear wheel 172 is secured which meshes with a second spur gear wheel 178 on one end of a shaft 180 of the roll 142. The shaft 180 protrudes from the roll 142 at both ends and is carried in a pivot bearing 182 at each end. The two pivot bearings 182 are rigidly connected with an insert part 184 which is inserted into the housing 114 and closes off a corresponding insert opening 186 (except for the passage 134) opening into the worm chamber 124.

The attachment 160 is provided with two observation windows 164 in the top wall 170 opposite to the passage 134. The attachment 160 is flanged in vacuum-tight manner to the housing 114.

In order to preclude an intermediate cooling of the extruder material in the region of the degassing device 136 the housing 114 is heatable. For this purpose at least the side walls are of double-walled formation, as may be seem from FIG. 3. The double-wall interior 190 is formed with appropriate connectors for the supply and withdrawal of heating medium, especially hot water or superheated steam. Such a connector 192 can be seen in FIG. 3.

In operation the rotating roll 142 prevents the material in paste form, conveyed by the two worms 150 and 152 into the decompression region and thus into the region of the passage 134, from rising in the passage 134 and finally entering the passageway 135 and penetrating beyond the housing exterior into the interior space 162 of the attachment 160. The roll 142 rotating in the direction of the arrow B' entrains the pasty material in the direction B' until finally it comes into the gathering region of the right worm 152 in FIG. 3, the direction of delivery of which (to the right in FIG. 3) is the same as that on the under side of the roll 142. For this purpose the surface of the conveyor roll 142 is formed so that the paste adheres. Correspondingly either a continuous or an interrupted layer 157 of extruder material remains hanging to the roll circumference, as soon as the corresponding section of the roll circumference detaches itself from the material which has swelled up into the passage 134. This layer 157 entered in FIG. 3 moves onwards to the scraper 141 and is removed by the latter from the roll 142 whereupon the material drops downwards (arrow direction E') and comes into the gathering region of the roll 152. This layer 157 forms an additional, relatively large evaporation and degassing area which under the prevailing vacuum ensures a rapid and thorough moisture removal and/or degassing. The gases formed in the region closed off by the scraper 141 to the right of the conveyor roll 142 in FIG. 3 can readily pass through under the roll 142 into the region to the left of the roll 142 and escape upwards through the passageway 135. This is due to the fact that the paste material under the roll 142 is in constant motion and in no case rests continuously smoothly on the roll 142, so that passageways for formed gases are always present. However it is also possible additionally to provide the scraper 141 with passage holes so that the gases formed beneath the scraper can escape directly upwards.

The two-shaft extruder 10 in its two embodiments, as described above with reference to the Figures is generally suitable for the drying and degassing of pasty materials which are at the same time subjected to an intensive intermixing action. The use of the extruder according to the invention in connection with the production of peroxide-containing pastes is of special advantage. The process according to the invention concerning the production of these pastes will be explained in greater detail below by some examples.

EXAMPLE 1

A mixture of 43.5% 2,4-dichloro benzoyl peroxide, 43.5% silicone oil of viscosity 350 mPa.s., 10% H$_2$O and 3.0% benzine of b.p. 70° C. is produced "in situ" by means of synthesis by reaction of 2,4-dichloro benzoyl chloride with alkaline hydrogen peroxide solution in the presence of silicone oil and benzine.

This granulate-type mass, which is heterogeneous as regards water content, is conveyed with the aid of the worm eccentric pump 20 into the extruder 10, possibly into an entry housing (not shown) of the extruder.

At this point, a great part of the mechanically-adhering water is squeezed out by means of the mechanical compression process (passages 24, 26). The mass, entering the build-up zone A of the extruder, then shows a composition of e.g. 46.5% 2,4 di-chloro benzoyl peroxide, 46.5% silicone oil, 4% H$_2$O and 3% benzine.

When passing the first degassing device 36, the benzine concentration of the mass is reduced to about 0.5%, the water concentration to about 1.5%; after having passed the second degassing device 36', benzine and water are completely extracted. During this process the extruder is heated by 35° C. warm water; only at the discharge end cooling water is applied.

There are not any obstructions inside the degassing devices 36, 36', which devices—by means of conveyor worm 42 also called belt worm (a metal band revolving around the core)—are transporting back the material swelling up into an passages (FIG. 1). The gases (vapors) can be extracted freely with the adjusted vacuum of about 12 mbar. With the same success one can use the degassing devices equipped with roller feedback, according to FIGS. 3 and 4. Once finished, the paste is discharged into atmosphere through a compacting nozzle and filled into containers. The paste is of excellent quality which is obvious especially when examining the data for strength (GIS (German Industrial Standard DIN) 53504) of a silicone rubber produced with this paste, this parameter being of importance for the application of this product:

tensile strength 12 N/sq.mm.±1

The products, produced in accordance with the hitherto existing method (i.e. by application of batch kneaders) show comparatively lower strength values of 10 N/sq.mm.±2 (sq.mm=mm$^2$) for the tensile strength and for elongation, with a greater fluctuation width.

This proves the improved homogeneity of the pastes produced in accordance with the invention. A less homogeneous distribution of the cross-linker in the paste—and thus also after working into silicone rubber—effects at the points of higher peroxide concentration a greater cross-linkage density, which results in reduced strength.

EXAMPLE 2

A mixture of 24% benzoyl peroxide, 42% silicone oil of viscosity 350 mPa.s., 13% H$_2$O and 3% benzine is produced by "in situ" synthesis and processed according to the procedure as described in Example 1. In this case the extruder is equipped with two conveyor roll degassing devices 136 according to FIGS. 3 and 4, with which the paste is satisfactorily conducted back into the worm chamber 124 (extruder space).

The tensile strength of vulcanized goods obtained with the paste produced in accordance with the invention lies at 13 N/sq.mm.±1 and thus about 30% higher than in products from batch production.

EXAMPLE 3

A mixture produced "in situ" from 47% benzoyl peroxide, 47% chloroparaffin and 4% H$_2$O is processed according to Example 2 into a 50% paste. In comparison with the paste produced by batches, a completely homogeneous distribution of the peroxide in the matrix is achieved. The absence of water in the paste is especially advantageous for its working into polyester resins.

EXAMPLE 4

A mixture of 54% cyclohexanone peroxide, 36% diisobutyl phthalate and 10% H$_2$O is dried and homogenized in the extruder with roll return. The 60% paste is distinguished by an especially high stability in storage.

EXAMPLE 5

A mixture of 46% t-butyl cyclohexyl peroxy dicarbonate 46% silicone oil with a viscosity of 100 mPa.s. and 8% $H_2O$ is produced by "in situ" synthesis and dried and homogenized according to Example 1 in an extruder with conveyor worm return. the paste containing 60% peroxide delivers silicone rubber vulcanisates with favourable strength values even at low processing temperatures.

In a similar manner paste-type mixtures even of other peroxides, possible with addition of co-agents such for example as azo-isobutyric nitrile, can be produced with optimum quality.

EXAMPLE 6

A mixture of 48 parts TMCH (1,1-bis-t-butyl peroxy-3,3,5-trimethyl cyclohexane), at 85%, in benzine of b.p. 70° C. and 15 parts EPDM (Mooney viscosity 35 at 100° C.), 20 parts silicic acid FK 320 and 24 parts Sokal U1 chalk is introduced into the two-shaft extruder and homogenized.

The benzine is withdrawn through the degassing passages. After emergence the composition is at 80° C. max. and contains less than 1% benzine. The extruder is cooled with water at 8° C.

The composition, a so-called "Master batch", is air-cooled and can also be granulated.

The danger-free removal of the benzine desensitizing agent, which is undesired in the end product, is advantageous in this process.

Pure TMCH is explosive and could not be used for the production of this "Master batch".

Highly volatile plasticisers are troublesome in use for rubber cross-linking; for example in the pressureless salt bath process they cause bubble formation.

EXAMPLE 7

A mixture of dicumyl peroxide (40 parts by weight) added with a pump in solution in 40% methylene chloride, EPDM rubber in powder form (Mooney viscosity 35 at 100° C. 8+1 min., 20 parts by weight), SOKAL U1 chalk (30 parts by weight) and TUDALEN B 80 EXTRA plasticiser (10 parts by weight) is introduced into the two-shaft extruder, homogenized and degassed.

After exit the composition is at 90° C. at maximum and contains no inhomogeneities and less than 1% methylene chloride. The extruder is cooled with water at 8° C.

This "Master batch" can be used for cross-linking for example EPDM rubber in the cable field, for which there are high purity requirements.

In order to prevent the presence of coarse particles or pollutions in the peroxide mixture, a sieve plate can be installed into the head at the delivery end of the extruder. Thus it can be ensured that the purity requirements of the cable industry for high-tension cables are fulfilled.

The process according to the invention offers advantages in safety technique over the batch process.

In the case of a batch kneader, the filling amounts for example to 300 kg. of 50% paste, corresponding to 150 kg. of organic peroxide.

In the case of a decomposition initiated by friction the machine can be considerably damaged; in all cases the surroundings would be soiled by the products of decomposition. When the process according to the invention is used, in the case of decomposition of the organic peroxide, only the mass of about 2.5 kg. situated in the extruder would be affected. Its products of decomposition would be sucked away through the vacuum conduit. Thus the decomposition of a relatively large quantity of organic peroxides can be completely prevented by suitable monitor devices.

The process according to the invention offers considerable advantages as regards labour expense. The manual filling and emptying of a batch kneader hitherto required an unavoidable use of energy, especially in the case of very tough pastes. The process according to the invention now renders possible a continuous and reliable production of pastes of organic peroxides and its extensive automation.

By the term "extruder material" used above there is understood the material to be processed in the extruder, for example the peroxide-containing paste.

While specific embodiments of the invention have been shown and described in detail to illustrate the application of the inventive principles, it will be understood that the invention may be embodied otherwise without departing from such principles.

What is claimed is:

1. A continuous process for the production of a peroxide-containing composition of high peroxide content in the form of a paste or a plastic comprising:
   introducing into a worm extruder a mixture of a peroxide-containing composition having at least 40 wt % of peroxide in solid or liquid form and evaporable constituents;
   homogenizing the mixture therein; and
   degassing the mixture therein to free said mixture of the evaporable constituents by:
   exposing to a degassing passage of the extruder a free surface area of the mixture which is more than about 40% of the cross-section of the degassing passage;
   providing a minimum gas passage in the degassing passage which is at least about 0.1 times the cross section of the degassing passage; and
   providing a return conveyor device in the degassing passage for returning to the extruder substantially of the mixture which enters the degassing passage.

2. Process according to claim 1, wherein the degassing is in vacuo.

3. Process according to claim 1 in which the degassing passage has an axis perpendicular to its cross-section which is perpendicular to the axis of the worm extruder.

4. Process according to claim 3 in which the return conveyor device comprises a conveyor roll whose axis is parallel to the axis of the worm extruder.

5. A continuous process for the production of a peroxide-containing composition of high peroxide content in the form of a paste or a plastic, comprising:
   introducing into a continuous kneader of mixture of a peroxide-containing composition having at least 40 wt. % of peroxides in solid or liquid form and evaporable constituents;
   homogenizing the mixture therein; and
   degassing the mixture therein to free said mixture of the evaporable constituents by:
   exposing to a degassing passage of the continuous kneader a free surface area of the mixture which is more than about 40% of the cross-section of the degassing passage;
   providing a minimum gas passage in the degassing passage which is at least about 0.1 times the cross section of the degassing passage; and
   providing a return conveyor device in the degassing passage for returning to the kneader substantially all of the mixture which enters the degassing passage.

* * * * *